United States Patent [19]
DeNicola, Jr. et al.

[11] Patent Number: 5,447,985
[45] Date of Patent: Sep. 5, 1995

[54] MODIFICATION OF (CO)POLYMERS WITH UNSATURATED PEROXYACIDS

[75] Inventors: Anthony J. DeNicola, Jr., Newark, Del.; Caroline C. H. Wei-Berk, Aston, Pa.; Andreas H. Hogt, Enschede, Netherlands; Jernej Jelenic, Schalkhaar, Netherlands; John Meijer, Deventer, Netherlands

[73] Assignees: Akzo Nobel N.V., Armhem, Netherlands; Himont Inc., Wilmington, Del.

[21] Appl. No.: 144,959

[22] Filed: Oct. 28, 1993

[51] Int. Cl.$^6$ ............................................. C08F 6/00
[52] U.S. Cl. .................................. 524/534; 524/536
[58] Field of Search .............................. 524/534, 536

[56] References Cited

FOREIGN PATENT DOCUMENTS

| | | |
|---|---|---|
| 815357 | 1/1974 | Belgium . |
| 999698 | 11/1976 | Canada . |
| 0208353 | 1/1987 | European Pat. Off. . |
| 0273990 | 7/1988 | European Pat. Off. . |
| 0322945 | 7/1989 | European Pat. Off. . |
| 6808574 | 12/1968 | Netherlands . |
| 9100300 | 1/1991 | WIPO . |
| 9100301 | 1/1991 | WIPO . |

OTHER PUBLICATIONS

"The Effects of Glass Fiber Size and Coupling Additives on the Properties of Glass Fiber Reinforced Polypropylene," PPG Silenka Information, pp. 7-12 (Oct. 1990).

"Degradation of Polyolefins During Melt Processing," Hinsken et al.; *Polymer Degradation and Stability*, 34, pp. 279-293 (1991).

*Rubber Chemistry and Technology*, vol. 61, pp. 242-253 W. Hofman, "Progress in Rubber and Plastics Technology," vol. 1, No. 2, Mar. 1985, pp. 18-50.

Primary Examiner—Bernard Lipman
Attorney, Agent, or Firm—Ralph J. Mancini; Louis A. Morris

[57] ABSTRACT

A process for the modification of a (co)polymer selected from $C_3$-$C_{10}$ α-olefin polymers, ethylene polymers, diene polymers and copolymers of $C_3$-$C_{10}$ α-olefins with ethylene and/or diene, to make the (co)polymer more suitable for reinforcement with polymer reinforcing material is disclosed. In the process, the (co)polymer is contacted with an acid group-containing unsaturated peroxide to modify the (co)polymer. The modification process results in improved properties such as adhesion to PUR lacquer and improved mechanical properties.

Also disclosed are a modification process carried out in the presence of an unsaturated coagent as well as the use of acid group-containing unsaturated peroxides for the modification of (co)polymers. Finally, the process may be carried out in a single processing step or in two or more successive processing steps.

20 Claims, No Drawings

MODIFICATION OF (CO)POLYMERS WITH UNSATURATED PEROXYACIDS

FIELD OF THE INVENTION

The present invention relates to a process for the reinforcement of (co)polymers of $C_3$–$C_{10}$ α-olefins, ethylene and/or dienes to thereby obtain advantageous properties. More particularly, the present invention relates to a process of modifying (co)polymers by contacting said (co)polymers with a peroxide compound containing an activated unsaturated group and an acid group in the presence of a polymer reinforcing material, or prior to the addition of a polymer reinforcing material.

BACKGROUND OF THE INVENTION

A good primer on glass fibre reinforcement of polypropylene is the article, "The Effects of Glass Fibre Size and Coupling Additives on the Properties of Glass Fibre Reinforced Polypropylene," PPG/Silenka Information, pp. 7–12, (October 1990). This article points out that glass fibre reinforcement of polypropylene can lead to improvements in tensile, flexural and impact strengths.

In addition, several factors influence the degree of improvement in these properties including the melt flow index of the polymer during processing with the glass fibre, the amount and type of coupling agent employed, the amount of glass employed, whether the materials are compounded in one processing step or in two or more processing steps and the presence or absence of an initiator during processing.

The article points out that typical coupling agents are (co)polymers which contain carboxyl groups. There are numerous additives for this purpose on the market. However, these coupling agents, while improving the adhesion between the polypropylene and the glass fibre, may not have a positive influence on the melt flow index during processing and/or on the end properties of the polypropylene. In particular, the coupling agent generally makes up about 10% by weight of the polypropylene composition and, since it is distributed throughout the composition, it can detrimentally effect one or more properties of the polypropylene.

The article also points out that other coupling agents such as the bismaleimides and the maleic acid anhydride and 4,4'-diaminodiphenylmethane in combination, may be employed. With the latter coupling agent, peroxide initiators may be employed to further improve the glass reinforced polypropylene properties. The article does not suggest the use of a peroxide initiator alone for improving the properties of glass fibre reinforced polypropylene.

There are a number of publications which describe the treatment of propylene (co)polymers with peroxides, albeit generally with different goals in mind. For instance, such references generally refer to a degradation or cross-linking of the propylene (co)polymers and degradation normally predominates. Generally, such peroxide treatments lead to a polypropylene with a narrow molecular weight distribution and having both lower number average and weight average molecular weights. A typical example of such publications is, "Degradation of Polyolefins during Melt Processing," Hinsken et al., *Polymer Degradation and Stability,* 34, pp. 279–293 (1991).

Canadian patent 999,698 discloses the degradation of polypropylene in a nitrogen atmosphere at 150°–220° C. by using organic peroxides such as t-butyl peroxymaleic acid and 2,5-bis(t-butylperoxy)-2,5-dimethyl hexane, among others. This modification process leads to a controlled reduction of at least 50% in the viscosity (an increase in the melt flow index (MFI)) of the polypropylene and thus significant degradation of the polypropylene. This degraded polypropylene is for use in hot melt adhesives wherefor, in general, amorphous atactic polypropylene is most suitable.

Netherlands patent application 6,808,574 discloses the modification of rubbers, including ethylene/propylene rubbers, by contacting the rubbers with a peroxide such as t-butyl peroxy crotonate or di-t-butyl-di-peroxy fumarate at a temperature of 140°–160° C. in order to crosslink the rubber composition.

In addition, the following patent publications disclose the modification of polypropylene with unsaturated peroxides: International patent applications WO 91/00301, WO 91/00300 and European patent applications 0 208 353, 0 273 990, and 0 322 945. In each case, the polypropylene is degraded resulting in a lower final weight average molecular weight, although, with the addition of unsaturated co-crosslinking agents, a crosslinked polypropylene with a higher molecular weight can be obtained.

Finally, Belgian patent publication 815,357 teaches the degradation of polypropylene with peroxides in an oxygen atmosphere. Unsaturated peroxides are not mentioned in this publication and the goal is to significantly reduce the molecular weight of the polypropylene.

It is the primary object of the present invention to modify (co)polymers in order to introduce an adhesion promoting functional group therein. It is a further object of the present invention to improve the properties of (co)polymers which are reinforced with polymer reinforcing materials. It is a still further object of the present invention to provide an improved process for the reinforcement of (co)polymers. These and other objects of the invention will be apparent from the description which follows.

SUMMARY OF THE INVENTION

The present invention relates to a process for the reinforcement of a (co)polymer selected from $C_3$–$C_{10}$ α-olefin polymers, ethylene polymers, diene polymers and copolymers of $C_3$–$C_{10}$ α-olefins with ethylene and/or a diene, characterized by contacting the (co)polymer with a peroxide represented by any of the formulas I–II to modify the (co)polymer:

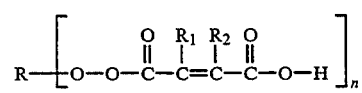

(I)

wherein n is 1–3, $R^1$, and $R^2$ are independently selected from hydrogen, $C_{1-10}$ alkyl groups, $C_{6-12}$ aryl groups, $C_{7-22}$ aralkyl groups and $C_{7-22}$ alkaryl groups, which groups may be substituted with one or more functional groups selected from hydroxy, halogen, ester, acid, amido, alkoxy, aryloxy, ketone and nitrile groups; and $R^1$ and $R^2$ may combine to form a ring;

when n=1; R=a tertiary alkyl group, a tertiary cycloalkyl group, a tertiary alkylcycloalkyl group, a tertiary alkynyl group containing 4–18 carbon atoms and a group of the general formula:

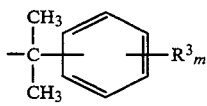

wherein m=0, 1 or 2 and $R^3$ represents an, isopropyl group, an isopropenyl group or a 2-hydroxyisopropyl group;

when n=2; R=an alkylene group with 7-carbon atoms which at both ends has a tertiary structure, an alkynylene group with 8–12 carbon atoms which at both ends has a tertiary structure, and a group of the general formula:

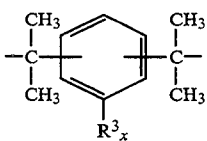

wherein x=0 or 1 and $R^3$ has the above-indicated meaning; and when n=3; R=1,2,4-triisopropylbenzene-$\alpha,\alpha',\alpha''$-triyl or 1,3,5-triisopropylbenzene-$\alpha,\alpha',\alpha''$-triyl; and

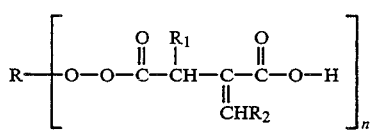

(II)

wherein n, R, $R^1$, $R^2$, are as defined above; and when there is an aromatic ring in the molecule in the case of disubstitution, the ring substituents must not be in a position ortho relative to each other and, in the case of trisubstitution, the ring substituents must not be in three adjacent positions; and mixing at least one polymer reinforcing material with said (co)polymer either before, during or after the step of contacting the (co)polymer with the peroxide.

In addition the present invention also relates to the use of the peroxides of the formulas I–II to modify (co)polymers which are reinforced or are to be subsequently reinforced with polymer reinforcing material.

DETAILED DESCRIPTION OF THE PREFERRED EMBODIMENTS

As used herein, α-olefin (co)polymer means an α-olefin polymer material selected from homopolymers of α-olefins and copolymers of α-olefins. Also embodied within the definition of α-olefin (co)polymer are α-olefins containing the usual additives such as fillers, pigments, stabilizers, etc. The most preferred (co)polymer is isotactic polypropylene.

The treatment of a (co)polymer by the process of the present invention generally produces a modified (co)polymeric material having functional groups introduced therein. Since peroxide radicals can cause chain scissions and/or crosslinking, there is normally a variation in the melt flow index of the polymer as a result of the peroxide modification. In the preferred process, the melt flow index is increased by the peroxide modification of the (co)polymer.

The (co)polymer treated by the process of the present invention may be in any physical form including finely divided particles (flake), pellets, film, sheet, and the like. In the preferred embodiments of the present invention the (co)polymer is in the finely divided form suitable for powder modification, or the (co)polymer is in the melt.

The amount of peroxide used in the process of the present invention should be an amount effective to modify the (co)polymer. More particularly, from 0.1 to 50 meq of peroxide, per 100 grams of (co)polymer, should be employed. More preferably, from 0.5 to 10 meq of peroxide, per 100 grams of (co)polymer is used. The melt flow index and degree of functional group introduction into the (co)polymer are, to a large extent determined by the type and amount of peroxide employed.

The peroxides useful in the present invention are those represented by the formulas I–II above. These peroxides are generally characterized as having an activated unsaturation within the peroxide molecule, which activating group is a carboxylic acid group. It has surprisingly been found that with this type of peroxide compound a significant improvement in the adhesion of the (co)polymer to polymer reinforcing materials can be achieved.

Particularly preferred peroxides in accordance with the present invention are t-butylperoxy maleic acid, t-butylperoxy itaconic acid and peroxides where n=1 and R is pinanyl.

The polymer reinforcing materials useful in the process of the present invention are talc, glass fibre materials, mineral fillers or fibres, silica and calcium carbonate. Glass fibre materials include chopped fibres, long continuous fibres, glass mats and other related products as known in the art. The reinforcing materials are preferably the so-called compatible fibres although other fibres can be employed.

In the process of the present invention, one or more peroxides of the formulas I–II are brought into contact with the (co)polymer and the mixture is heated to a temperature of 120°–240° C. for a time sufficient to decompose substantially all of the peroxide. A more preferred temperature range is from 130°–235° C. The preferred modification temperature will depend upon the particular peroxide to be employed in the process, as well as whether melting of the (co)polymer during the process is desirable.

The reaction time used in the present process is preferably greater than 5, and more preferably, greater than 10 times the half life of the peroxide at the reaction temperature. The reaction time at 140° C. will generally range from 0.1 minutes to 180 minutes and, more preferably, from 10 minutes to 120 minutes. At 180° C. the reaction time is generally from 0.1 to 15 minutes.

The melt modification process is carried out in the conventional manner for modifying polymers in the melt. Such a process is described in International patent application publication number WO 91/00301, the disclosure of which is hereby incorporated by reference.

The process of the present invention may be carried out in a single processing step or it may be carried out in two or more separate processing steps. The one-step process comprises the embodiments wherein the polymer reinforcing material is mixed into the (co)polymer in the same processing step as the peroxide.

The reinforced (co)polymer products have several improved properties with respect to comparable unmodified, reinforced (co)polymers, including improved impact strength, flexural strength, tensile strength and elongation at break. Further, the other properties of the (co)polymer remain at at least the same level as the unmodified, reinforced (co)polymer. Also, the melt flow index of the (co)polymer is significantly increased by the modification process leading to advantages in polymer processing such as optimum surface wetting of the reinforcing material.

In the "two-step process" the (co)polymer is first modified with the peroxide and subsequently, in a second processing step, the modified (co)polymer is compounded with the polymer reinforcing material. In the two-step process, it is possible to modify all (co)polymer which will reinforced or, in an alternative embodiment, the modified (co)polymer may be used as an additive to (co)polymer and reinforcement material or to unmodified reinforced (co)polymer.

The two-step process provides an increase in the melt flow index of the (co)polymer thereby facilitating the subsequent mixing of the modified (co)polymer with the reinforcing material and/or reinforced (co)polymer. Further, the two-step process improves the impact strength, the flexural strength, the tensile strength and the elongation at break in the resultant reinforced (co)polymer.

In another embodiment of the present invention, the modification process is carried out in the presence of a coagent in order to influence the melt flow index of the (co)polymer and/or enhance the degree of modification of the (co)polymer.

A coagent is generally understood to be a polyfunctional reactive additive such as a polyunsaturated compound which will react rapidly with polymer radicals, will overcome steric hindrance effects and minimize undesirable side reactions. Further information about coagents is set forth in Rubber Chemistry and Technology, Vol. 61, pp. 238–254 and W. Hofmann, Progress in Rubber and Plastics Technology, Vol. 1, No. 2, March 1985, pp. 18–50, the disclosures of which are hereby incorporated by reference. In relation to the present invention, the term "coagent" has the same meaning as given in these publications.

A wide variety of useful coagents are commercially available including di- and triallyl compounds, di- and tri (meth)acrylate compounds, bismaleimide compounds, divinyl benzene, vinyl toluene, vinyl pyridine, parachinone dioxime, 1,2-cis-polybutadiene and their derivatives. Particularly preferred coagents include triallyl cyanurate, triallyl isocyanurate, ethylene glycol dimethacrylate and trimethylolpropane trimethacrylate.

The incorporation of an effective amount of one or more of these coagents into the (co)polymer, prior to or during the reaction with the present peroxides will tend to influence the melt flow index and molecular weight of the modified (co)polymer. In general, the coagents tend to reduce or prevent the degradation of the modified materials, with the degree of reduction in degradation depending to some extent upon the type and amount of coagent employed.

Surprisingly, in some cases the coagent may result in improved mechanical properties such as an enhanced adhesion strength in modified (co)polymers. These enhancements may be attributable to a greater degree of functional group introduction into the (co)polymer resulting from the presence of the coagent.

The amount of coagent employed is preferably from 0.1 to 20 mmol per 100 grams of (co)polymer and more preferably from 1 to 10 mmol per 100 grams of (co)polymer.

The following examples are provided for the purpose of illustration and description only and are not intended to limit the scope of the invention in any way. The scope of the invention is to be determined from the claims appended hereto.

The following materials and methods are employed in the examples.

Polymers
  Moplen TM FLS20 homopolymer of polypropylene, ex. Himont
  Moplen TM D60P homopolymer of polypropylene, ex. Himont
  Hifax TM SP 179 copolymer of polypropylene, ex. Himont
  Hostalen TM PPH 1050 ground homopolymer of polypropylene, ex. Hoechst
  Hostalen TM PPU 0180P homopolymer of polypropylene, ex. Hoechst
  Hostalen TM PPN 7790 GV30% glass fiber-reinforced polypropylene, ex. Hoechst
  Hostalen TM PPN 1060F homopolymer of polypropylene, ex. Hoechst
  Accurel TM EP 100 SR empty porous polypropylene powder (PPP), ex. Akzo Fibers & Polymers (0.4–1.0 μm).
  7025XOS 9.2 dg/min melt flow rate porous polypropylene homopolymer in spherical form, ex. Himont.
  7026XOS 23.9 dg/min melt flow rate porous polypropylene homopolymer in spherical form, ex. Himont.
  KP020 23 dg/min melt flow rate, high porosity spherical form polypropylene homopolymer.

Peroxides
  Tertiary butylperoxy maleic acid (TBMPM).
  Tertiary butylperoxy itaconic acid (TBMPI).

Glass Fibre
  Silenka TM 8394 chopped strands 4.5 mm. (suitable for reinforcement of polypropylene), ex. Silenka
  Silenka υ 8086 chopped strands 4.5 mm. (suitable for reinforcement for thermoplastic polyesters),ex. Silenka.
  PPG 3090 epoxysilane sizing, 3/16 inch nominal length.
  PPG 3232 aminosilane sizing, 3/16 inch nominal length.

Miscellaneous
  Perkalink TM 401 ethylene glycol dimethacrylate, ex. Akzo Chemicals
  Hercoprime TM G maleic acid modified polypropylene, ex. Himont
  Hercoprime TM maleic acid modified polypropylene, ex. Himont
  2 component polyester-polyurethane laquer 2K-PUR-Decklack TM (45-99905) ex. Akzo Coatings Stuttgart and 2K-PUR- Härter TM (07-20810) ex. Akzo Coatings Stuttgart.
  Epikote TM DX 235 bisphenol A/F epoxyresin, ex. Shell
  Epilink TM 177 polyamino amide, ex. Akzo Chemicals
  Silane TM A174 γ-aminopropylthemethoxysilane, ex. Union Carbide
  Saatilene TM 120T polyamide woven fabric DBM, dibutyl maleate ex. Merck-Schuchardt Lusolvan TM FBH, DIBN, diisobutyl nylonate, ex. BASF Perkalink 300 triallyl cyanurate (TAC), ex. Akzo Chemicals Irganox TM 1010 conventional hindered phenol antioxidant, ex. Ciba-Geigy Sandostab TM P-EPQ conventional stabilizer, the main component of which is tetrakis (2,4-di-tert-butyl-phenyl)-4,4′ biphenylene diphosphonite., ex. Sandoz.

Ca Stearate: conventional antacid additive, commercially available.

Modification Procedures

Procedures A-B, D.1, D.2 and E.1 are one-step compounding processes whereas procedures C and E.2 are two-step compounding processes.

A. The modification of polypropylene with TBMPM was carried out using a Haake-Rheocord TM System 40 fitted with a mixing chamber (Rheomix TM 600 containing roller rotors—180°, 15 min., 30 rpm.). The reaction product was granulated and hot-pressed between Mylar TM foil into a 1 mm. thick sheet and a 50-100 μm film by compression moulding (180° C.) using a Fontyne TM press.

Films were extracted in solvent (dichloromethane/cyclohexane 75/25; sample concentration: 20 ml. solvent/film) by ultrasonic treatment for 2 hours. The films were then dried in a vacuum oven at 50° C. for 4 hours.

B. Compositions were extruded using a ZSK 30 (Werner & Pfleiderer) twin screw extruder using a typical GFR screw design (W&P) at 220° C. and 300 rpm. After extrusion, the granulated products were dried at 60° C. before further processing.

C. Polypropylene was modified with peroxide at 170°-225° C. using a ZSK twin screw extruder. The modified polypropylene was granulated and compounded with glass fibres using a ZSK30 (Werner & Pfleiderer TM) twin screw extruder fitted with the GFR screw.

D.1. Peroxide and coagent were dosed onto a porous polypropylene carrier. Polypropylene and a stabilizer package of conventional stabilizers are mixed in a Henschel TM Mill. Compounding was done on a 40 mm Werner & Pfleiderer TM twin screw extruder with a standard 3-vent screw. Compounding parameters were 350 rpm screw speed, 230° C. flat barrel temperature profile, and 120 lbs/hr throughput. The fibre concentration was fixed at 30 wt %. The peroxide and coagent on a porous polypropylene carrier were added in barrel 1 and the glass fibres in barrel 6.

D.2. The same as D.1 except that both the glass fibres and the peroxide/coagent on a porous polypropylene carrier were added in barrel 6, the screw speed was increased to 500 rpm and vacuum was applied to barrel 8.

E.1 Peroxide and coagent were dosed onto a porous polypropylene carrier. Then, peroxide and coagent were compounded with the polypropylene matrix and glass fibre in a 40 mm Werner & Pfleiderer TM twin screw extruder as i n D.1 above.

E.2 Peroxide and coagent were dosed onto a porous polypropylene carrier. Then, the peroxide/coagent mixture on the carrier were compounded in a Leistritzυ twin screw extruder to produce a material with very a high melt flow index. This material was then used as an additive to a second compounding step in a Werner & Pfleiderer TM twin screw extruder with polypropylene matrix and glass fibre.

Injection Moulding

For modification procedures A, B and C above, the granulate was injection moulded on an Arburg TM 221/150R injection moulding machine into test specimens for Izod impact strength/bending strength (8×1×0.4 cm.). The temperature profile was 220°/230°/240° C. (die), mould 60° C.

For modification procedures D.1 and D.2 above, test specimens were molded on a 5 oz. Battenfield TM injection molder with a nozzle temperature of 246° C., a mold temperature of 60° C. and a 2.41 MPa injection pressure. For very high melt flow material in the 80g/10 min. range, the nozzle temperature was lowered to 232° C.

Test Procedures

The following test apparatus and methods were used. The carbonyl (CO) index was determined by IR-spectroscopy on pressed films before and after extraction by dividing the carbonyl absorption peak (1720 $cm^{-1}$ to 1740 $cm^{-1}$) by the reference peak (1167 $cm^{-1}$).

MFI (Melt Flow Index) was measured with a Göttfert TM Melt Indexer (model MP-E) according to DIN 53735/ASTM 1238 (230° C., 21.6N load).

3 point bending was measured with a Zwick TM Tensile Tester 1445 (ISO 178) for Examples 1–8 and for the remaining examples according to ASTM D638-89.

Impact strength was measured with a Zwick TM Impact Tester 5102 (ISO 180–1982 (E)) for Examples 1–8 and for the remaining examples using an Izod impact tester according to ASTM D256A.

PUR Adhesion: The coating was prepared by mixing the 2K PUR Decklack TM with the 2K PUR Härter TM in a ratio of 3:1. Polymer sheets (20×120×1 mm) were covered with the coating. Then, a nylon fabric (25×240 mm) was pressed into the coated surface of the strips. After 10 minutes flash off time and 40 minutes stoving at 90° C., the peel strength was determined.

Epoxy Adhesion: Epoxy resin was prepared by mixing 10 g Epikote TM DX235, 6 g. Epilink TM 177 and 0.08 g. Silane TM A174. A thin film of resin (adhesion area 15×15 mm) was applied to a piece of polymer (60×15×1 mm). Another piece of polymer was clamped to it and after 72 hours at 30° C., lap shear strength was determined.

Flexural properties were measured according to ASTM D790-86.

EXAMPLE 1

Hostalen TM PPU 0180P (PP) was modified with TBMPM and TBMPI in a mixing chamber by procedure A detailed above. After modification, the adhesion properties and the carbonyl index (before and after extraction) were determined. The results are given in Table 1.

TABLE 1

| Compound | 1a | 1b | 1c |
|---|---|---|---|
| TBMPM (meq./100 g PP) | — | 20 | — |
| TBMPI | — | — | 20 |
| PP analysis: | | | |
| CO index before extr. | — | 0.16 | 0.26 |
| CO index after extr. | — | 0.11 | 0.16 |
| Adhesion properties: | | | |
| PUR adhesion (N/m) | 50 | 180 | 150 |

TABLE 1-continued

| Compound | 1a | 1b | 1c |
|---|---|---|---|
| Epoxy adhesion (MPa) | 0.24 | >1.2 | 0.78 |

The increased carbonyl index indicates that carbonyl group-containing functional groups had been introduced to the polymer, which groups were largely retained after extraction. Also notable is that the TBMPM and TBMPI modified PP exhibited improved adhesion to PUR lacquer and epoxy resin.

EXAMPLE 2

Glass Fibre-reinforced Polypropylene (GFR-PP)

Polypropylene was modified with TBMPM in accordance with procedure B above. Glass-fibres were also added to obtain a glass-fibre-reinforced compound. The compositions and results of the modications are given in Table 2. Before modification, TBMPM was dissolved in acetone and immediately thereafter, a 50% mix of peroxide (active material) on Accurel TM PP was made. Acetone was evaporated by 20° C. vacuum for 2 hours. Also, a mix of 50% of coagent on Accurel TM PP was made.

TABLE 2

| Compound (wt. %) | 2a | 2b | 2c | Hostalen PPN 7790 GV2/30 |
|---|---|---|---|---|
| Moplen TM FLS 20 | 70 | 68 | 68.1 | |
| Accurel TM PP | — | — | 1.4 | |
| Hercoprime TM G | — | 2 | — | |
| Perkalink TM 401 | — | — | 0.5 | |
| Silenka TM 8086 | 30 | 30 | 30 | |
| TBMPM (meq/100 g compound) | — | — | 5 | |
| Impact strength (ISO 180): | | | | |
| Unnotched Izod (kJ/m$^2$) | 9.0 ± 0.5 | 44.8 ± 1.9 | 40.4 ± 2.1 | 41.2 ± 1.9 |
| 3 point bend (ISO 178): | | | | |
| Flex. str. (N/mm$^2$) | 56 ± 1 | 116 ± 2 | 116 ± 1 | 100 ± 2 |
| Flex. mod. (N/mm$^2$) | 4125 ± 200 | 4610 ± 80 | 4565 ± 75 | 3735 ± 75 |
| Elong at break (%) | 2.7 ± 0.3 | 4.0 ± 0.1 | 4.0 ± 0.1 | 5.0 ± 0.3 |

Using TBMPM, an improvement in the mechanical properties of GFR-PP was observed, even in comparison to the commercially available Hercoprime TM G and a commercial GFR-PP (Hostalen TM PPN 7790).

EXAMPLE 3

PP compounds with Slienka TM 8394 glass-fibres were modified using procedure B above and the results are given in Table 3. Using TBMPM and a coagent (Perkalink TM 401), impact strength, flexural strength and flexural modulus were similar to or improved with respect to the non-modified polypropylene and/or the Hercoprime TM G modified product. In addition, this modification process resulted in a good retention of molecular weight in the modified polymer.

TABLE 3

| Compound (wt %) | 3a | 3b | 3c | 3d |
|---|---|---|---|---|
| Moplen TM D60P | 70 | 63 | 63.4 | 63.7 |
| Hostalen TM PPH 1050 | — | 5 | 6.1 | 4.6 |
| Accurel 1 TM PP | — | — | 0.5 | 1.2 |
| Hercoprime TM G | — | 2 | — | — |
| Perkalink TM 401 | — | — | — | 0.5 |
| Silenka TM 8394 | 30 | 30 | 30 | 30 |
| TBMPM (meq./100 g compound) | — | — | 2.5 | 5 |
| Impact strength (ISO 180): | | | | |
| Unnotched Izod (kJ/m$^2$) | 21.8 ± 1.2 | 32.5 ± 1.0 | 25.2 ± 1.5 | 32.3 ± 1.5 |
| 3 point bend. (ISO 178): | | | | |
| Flex. str. (N/mm$^2$) | 84 ± 1 | 87 ± 2 | 89 ± 2 | 92 ± 2 |
| Flex. mod. (N/mm$^2$) | 3400 ± 35 | 3355 ± 85 | 3720 ± 100 | 3605 ± 70 |
| Elong at break (%) | 4.3 ± 0.3 | 5.3 ± 0.4 | 4.0 ± 0.2 | 4.8 ± 0.3 |
| Rheological properties MFI (g/10 min) | 13 | 5.6 | 13 | 10 |

EXAMPLE 4

GFR-PP from Polypropylene Homopolymers and Copolymers

PP compounds with glass fibres were modified by procedure B as detailed above. The components of the compositions and the results of this example are given in Table 4. From Table 4 it is apparent that mechanical properties (impact strength, flexural strength) of GFR-PP of both homopolymers and copolymers were improved by modification with TBMPM. Addition of a coagent further improved the properties.

TABLE 4

| Compound (wt %) | 4a | 4b | 4c | 4d | 4e | 4f | 4g | 4h |
|---|---|---|---|---|---|---|---|---|
| Moplen TM D60P | 70 | 63.4 | 63.4 | 63.9 | — | — | — | — |
| Hifax TM SP 179 | — | — | — | — | 70 | 63.4 | 63.4 | 63.9 |
| Hostalen TM PPH 1050 | — | 6.1 | 5.6 | 4.1 | — | 6.1 | 5.6 | 4.1 |
| Accurel 1 TM PP | — | 0.5 | 0.76 | 1.5 | — | 0.5 | 0.76 | 1.5 |
| Perkalink TM 401 | — | — | 0.25 | 0.5 | — | — | 0.25 | 0.5 |
| Silenka TM 8086 | 30 | 30 | 30 | 30 | 30 | 30 | 30 | 30 |
| TBMPM (meq./100 g compound) | — | 2.5 | 2.5 | 5 | — | 2.5 | 2.5 | 5 |

TABLE 4-continued

| Compound (wt %) | 4a | 4b | 4c | 4d | 4e | 4f | 4g | 4h |
|---|---|---|---|---|---|---|---|---|
| Impact strength | | | | | | | | |
| Unnotched Izod (kJ/m$^2$) | 8.8 ± 0.4 | 22.2 ± 1.3 | 32.0 ± 1.0 | 29.6 ± 1.5 | 10.2 ± 1.3 | 25.6 ± 1.4 | 33.6 ± 1.8 | 32.8 ± 1.4 |
| 3 point bending: | | | | | | | | |
| Flex. str. (N/mm$^2$) | 57 ± 1 | 89 ± 2 | 98 ± 2 | 94 ± 2 | 32 ± 1 | 73 ± 1 | 79 ± 1 | 78 ± 1 |
| Elong. at break (%) | 2.3 ± 0.1 | 3.0 ± 0.1 | 3.8 ± 1.0 | 4.1 ± 0.2 | 3.6 ± 0.1 | 3.6 ± 0.1 | 4.9 ± 0.1 | 4.8 ± 0.3 |
| Rheological properties MFI (g/10 min) | 13 | 17 | 15 | 10 | 5.9 | 18 | 18 | 16 |

EXAMPLE 5

Polypropylene compositions with glass fibres were modified according to procedure B above and the results are given in Table 5. Using TBMPM, the mechanical properties, namely impact strength, flexural strength and flexural modulus, were similar to, or improved over the commercially available Hercoprime ™ G modified polypropylene.

TABLE 5

| Compound (wt %) | 5a | 5b | 5c | 5d | 5e |
|---|---|---|---|---|---|
| Moplen ™ D60P | 70 | 63 | 63.6 | 63.9 | 63.4 |
| Hostalen ™ PPH 1050 | — | 5 | 5.7 | 5.2 | 4.3 |
| Accurel 1 ™ PP | — | — | 0.7 | 0.9 | 1.3 |
| Hercoporime ™ G | — | 2 | — | — | — |
| Perkalink ™ 300 | — | — | 0.21 | 0.42 | 0.42 |
| Silenka ™ 8394 | 30 | 30 | 30 | 30 | 30 |
| TBMPM (meq./100 g compound) | — | — | 2.5 | 2.5 | 5.0 |
| Impact strength (ISO 180) Unnotched Izod (kJ/m$^2$) | 25 ± 2 | 36 ± 3 | 30 ± 3 | 32 ± 2 | 29 ± 1 |
| 3 point bending: (ISO 178) | | | | | |
| Flex. str. (N/mm$^2$) | 89 ± 1 | 93 ± 2 | 97 ± 2 | 102 ± 1 | 94 ± 1 |
| Flex. mod. (N/mm$^2$) | 3885 ± 50 | 3845 ± 65 | 4190 ± 80 | 4370 ± 145 | 4065 ± 85 |
| Elong. at break (%) | 3.6 ± 0.1 | 4.0 ± 0.1 | 3.7 ± 0.1 | 3.7 ± 0.1 | 3.8 ± 0.1 |
| Rheological properties MFI (g/10 min) | 12 | 5.2 | 17 | 22 | 12 |

EXAMPLE 6

Polypropylene compositions with glass fibres were modified according to procedure B above. Formulations of 40% TBMPM in DBM and 25% of TBMPM in DIBN were made. The 40% TBMPM formulation was used in the same manner as in previous experiments but the 25% TBMPM in DIBN was pumped directly to the hopper of the extruder using a Watson Marlow ™ peristaltic pump (101U/R; 0.06-2 rpm).

Using TBMPM, the impact strength of the glass fibre reinforced polypropylene was improved with respect to the non-modified polypropylene to about the same extent as with Hercoprime ™ G modified polypropylene. The results are given in Table 6.

TABLE 6

| Compound (wt %) | 6a | 6b | 6c | 6d | 6e | 6f |
|---|---|---|---|---|---|---|
| Hostalen ™ PPUO180P | 70 | 68 | 69.1 | 68.4 | 69.6 | — |
| Hostalen ™ PPN 1060F | — | — | — | — | — | 69.6 |
| Accurel ™ PP | — | — | 0.9 | 1.6 | 0.42 | 0.42 |
| Hercoprime ™ G | — | 2 | — | — | — | — |
| DBM | — | — | — | 0.71 | — | — |
| DIBN | — | — | — | — | 1.41 | 1.41 |
| Perkalink ™ 300 | — | — | 0.42 | 0.42 | 0.42 | 0.42 |
| Silenka ™ 8394 | 30 | 30 | 30 | 30 | 30 | 30 |
| TBMPM (meq./100 g compound) | — | — | 2.5 | 2.5 | 2.5 | 2.5 |
| Impact Strength (ISO 180) Unnotched Izod (kJ/m$^2$) | 18 ± 2 | 32 ± 3 | 25 ± 2 | 25 ± 2 | 28 ± 3 | 30 ± 2 |
| Rheological Properties MFI (g/10 min) | 35 | 36 | 87 | 107 | 119 | 31 |

EXAMPLE 7

Glass fibre reinforced polypropylene compounds were prepared by procedure C above (two-step process). As a comparison, three compositions were also modified according to procedure B above (one-step process). The components of the compositions and the results are given in Tables 7-8 below.

TABLE 7

| Compound (wt %) | 7a | 7b | 7c |
|---|---|---|---|
| Hostalen PPN 106OF | 100 | 92.9 | 93.8 |
| Hostalen PPH 1050 | — | 6.2 | 4.4 |
| Accurel PP | — | 0.9 | 1.8 |
| Perkalink 300 | — | 0.42 | 0.84 |
| TBMPM (meq./100 g compound) | — | 2.5 | 5 |
| Rheological Properties MFI (g/10 min.) | 2.8 | 30 | 28 |

TABLE 8

| Compound (wt %) | Procedure C | | | Procedure B | | |
|---|---|---|---|---|---|---|
| | 7d | 7e | 7f | 7g | 7h | 7i |
| Hostalen TM PPN 1060F | — | — | — | 62.4 | 70 | 63.5 |
| Hostalen TM PPH 1050 | — | — | — | 6.7 | — | 6.5 |
| Accurel TM PP | — | — | — | 0.9 | — | — |
| Hercoprime TM G | — | — | — | — | — | 2 |
| Perkalink TM 300 | — | — | — | 0.42 | — | — |
| Compound 8a | 70 | — | — | — | — | — |
| Compound 8b | — | 70 | — | — | — | — |
| Compound 8c | — | — | 70 | — | — | — |
| Silenka TM 8394 | 30 | 30 | 30 | 30 | 30 | 30 |
| TBMPM (meq./100 g compound) | — | 1.75 | 3.5 | 2.5 | — | — |
| Impact Strength (ISO 180) Unnotched Izod (kJ/m$^2$) | 15 ± 1 | 40 ± 3 | 42 ± 3 | 29 ± 2 | 14 ± 1 | 36 ± 2 |
| 3 point bend. (ISO 178) | | | | | | |
| Flex. Str. (N/mm$^2$) | 88 ± 2 | 120 ± 1 | 122 ± 1 | 105 ± 1 | 80 ± 2 | 104 ± 2 |
| Flex. mod. (N/mm$^2$) | 4570 ± 80 | 4910 ± 75 | 4885 ± 65 | 4505 ± 125 | 4020 ± 55 | 4455 ± 25 |
| Elong. at break (%) | 2.5 ± 0 | 4.0 ± 0.1 | 4.0 ± 0.1 | 3.5 ± 0.1 | 2.7 ± 0.1 | 4.0 ± 0.1 |
| Rheological properties MFI (g/10 min.) | 21 | 49 | 60 | 20 | 3.8 | 3.0 |

Using TBMPM, the mechanical properties of the glass fibre reinforced polypropylene were improved in comparison to the unmodified or the Hercoprime TM G modified polypropylene. In all cases, the modification increased the melt flow index.

EXAMPLES 8-11

Glass fibre reinforced polypropylene compounds were prepared by procedure D.1 above (one-step process). For each example there is a control (the "a" examples), a comparison to the commercially available coupling agent Hercoprime TM G201 (the "b" examples) and the example in accordance with the invention (the "c" examples). The amounts of each component and the results are given in Table 9.

These examples demonstrate that the process of the present invention gives consistent improvements in important glass reinforced polymer properties even when compared with the commercially available Hercoprime TM G201 coupling agent.

EXAMPLES 12-15

In examples 12-15, procedure D.2 above was employed. The amounts of the ingredients and the results are given in Table 10.

TABLE 10

| | Example Number | | | |
|---|---|---|---|---|
| | 12 | 13 | 14 | 15 |
| Component in wt % | | | | |

TABLE 9

| | Example Number | | | | | | | | | | | |
|---|---|---|---|---|---|---|---|---|---|---|---|---|
| | 8a | 8b | 8c | 9a | 9b | 9c | 10a | 10b | 10c | 11a | 11b | 11c |
| Component in wt % | | | | | | | | | | | | |
| 7025 XOS Polypropylene | 69.75 | 68.35 | 58,97 | | | | 69.75 | 68.35 | 58.97 | | | |
| 7026 XOS Polypropylene | | | | 69.75 | 68.35 | 58.97 | | | | 69.75 | 68.35 | 58.97 |
| Hercoprime TM G201 | | 1.40 | | | 1.40 | | | 1.40 | | | 1.40 | |
| TBMPM Concentrate* | | | 6.37 | | | 6.37 | | | 6.37 | | | 6.37 |
| TAC Concentrate** | | | 4.41 | | | 4.41 | | | 4.41 | | | 4.41 |
| Irganox TM 1010 | 0.1 | 0.1 | 0.1 | 0.1 | 0.1 | 0.1 | 0.1 | 0.1 | 0.1 | 0.1 | 0.1 | 0.1 |
| P-EPQ | 0.08 | 0.08 | 0.08 | 0.08 | 0.08 | 0.08 | 0.08 | 0.08 | 0.08 | 0.08 | 0.08 | 0.08 |
| Ca Stearate | 0.07 | 0.07 | 0.07 | 0.07 | 0.07 | 0.07 | 0.07 | 0.07 | 0.07 | 0.07 | 0.07 | 0.07 |
| PPG 3090 Glass Fibers | 30 | 30 | 30 | 30 | 30 | 30 | | | | | | |
| PPG 3232 Glass Fibers | | | | | | | 30 | 30 | 30 | 30 | 30 | 30 |
| TBMPM (meq/100 g compound) | | | 2.5 | | | 2.5 | | | 2.5 | | | 2.5 |
| TAC (meq/100 g compound) | | | 5 | | | 5 | | | 5 | | | 5 |
| Properties | | | | | | | | | | | | |
| Unnotched Izod (J/m) | 211 | 594 | 644 | 169 | 621 | 624 | 202 | 633 | 736 | 232 | 662 | 578 |
| Notched Izod (J/m) | 50 | 95 | 95 | 48 | 93 | 96 | 49 | 96 | 103 | 52 | 91 | 105 |
| Flexural Modulus (MPa) | 4720 | 5062 | 5442 | 4838 | 5072 | 4957 | 4874 | 5099 | 5626 | 5061 | 5688 | 5739 |
| Flexural Strength (MPa) | 62 | 120 | 132 | 64 | 124 | 125 | 83 | 125 | 139 | 91 | 136 | 141 |
| Tensile Strength (MPa) | 39 | 80 | 85 | 43 | 83 | 86 | 56 | 82 | 89 | 66 | 88 | 88 |
| Elongation @ Break (%) | 4.2 | 8.8 | 8.2 | 3.8 | 8.8 | 8.4 | 4.9 | 9.2 | 8.8 | 5.4 | 8.5 | 8.7 |
| MFR (g/10 min) | 5.1 | 6.6 | 48.5 | 7.9 | 11.4 | 78.6 | 5.7 | 7.4 | 70.8 | 9.0 | 12.4 | 76.9 |

*7.5 wt % TBMPM on 7025XOS or 7026XOS, depending on matrix PP
**10 wt % Perkalink TM 300 on 7025XOS or 7026XOS, depending on matrix PP TABLE 10-continued

|  | Example Number | | | |
|---|---|---|---|---|
|  | 12 | 13 | 14 | 15 |
| Upstream Addition-Barrel #1 | | | | |
| 7025 XOS Polypropylene | 56.62 |  | 56.62 |  |
| 7026 XOS polypropylene |  | 56.62 |  | 56.62 |
| Irganox TM 1010 | 0.1 | 0.1 | 0.1 | 0.1 |
| P-EPQ | 0.08 | 0.08 | 0.08 | 0.08 |
| Ca Stearate | 0.07 | 0.07 | 0.07 | 0.07 |
| Downstream Addition-Barrel #6 | | | | |
| TBMPM Concentrate* | 6.37 | 6.37 | 6.37 | 6.37 |
| TAC Concentrate** | 4.41 | 4.41 | 4.41 | 4.41 |
| 7025 XOS Polypropylene | 2.35 |  | 2.35 |  |
| 7026 XOS Polypropylene |  | 2.35 |  | 2.35 |
| PPG 3090 Glass Fiber | 30 | 30 |  |  |
| PPG 3232 Glass Fiber |  |  | 30 | 30 |
| TBMPM (meq/100 g compound) | 2.5 | 2.5 | 2.5 | 2.5 |
| TAC (meq/100 g compound) | 5 | 5 | 5 | 5 |
| Properties | | | | |
| Unnotched Izod (J/m) | 358 | 350 | 624 | 553 |
| Notched Izod (J/m) | 66 | 63 | 91 | 84 |
| Flexural Modulus (Mpa) | 5188 | 5030 | 5631 | 5818 |
| Flexural Strength (MPa) | 109 | 107 | 132 | 138 |
| Tensile Strength (MPa) | 68 | 70 | 86 | 86 |
| Elongation @ Break (%) | 6.3 | 6.4 | 8.8 | 8.5 |
| MFR (g/10 min) | 36.3 | 51.3 | 24.4 | 51.4 |

*7.5 wt % TBMPM on 7025 XOS, depending on matrix PP
**10 wt % Perkalink TM 300 on 7025 XOS or 7026 XOS, depending on matrix PP Table 10 shows that downstream addition of the modifying agent in the extruder also gives good results in the process of the present invention though procedure D.1 appears to give consistently better results than D.2 due probably to the longer contact time between the modifying agent and the (co) polymer in the extruder.

EXAMPLES 16-28

In examples 16-28, the procedure D.1 above was employed. These examples show the effects of varying the relative amounts of the peroxide and the coagent used in the modification process. The amounts of the ingredients are given in Table 11 along with the results of these experiments.

TABLE 11

|  | Example Number | | | | | | | | | | | | |
|---|---|---|---|---|---|---|---|---|---|---|---|---|---|
|  | 16 | 17 | 18 | 19 | 20 | 21 | 22 | 23 | 24 | 25 | 26 | 27 | 28 |
| Component in wt % | | | | | | | | | | | | | |
| 7026XOS Polypropylene | 65.39 | 61.06 | 65.11 |  | 57.05 | 59.91 |  |  |  | 54.19 | 53.05 | 49.00 | 48.52 |
| KP020 Polypropylene |  |  |  | 57.05 |  |  | 57.05 | 57.05 | 57.05 |  |  |  |  |
| TBMPM Concentrate* | 0.87 | 3.15 | 3.15 | 9.18 | 9.18 | 9.18 | 9.18 | 9.18 | 9.18 | 9.18 | 15.21 | 15.21 | 17.71 |
| TAC Concentrate** | 3.52 | 5.54 | 1.49 | 3.52 | 3.52 | 0.66 | 3.52 | 3.52 | 3.52 | 6.38 | 1.49 | 5.54 | 3.52 |
| Irganox TM 1010 | 0.1 | 0.1 | 0.1 | 0.1 | 0.1 | 0.1 | 0.1 | 0.1 | 0.1 | 0.1 | 0.1 | 0.1 | 0.1 |
| P-EPQ | 0.08 | 0.08 | 0.08 | 0.08 | 0.08 | 0.08 | 0.08 | 0.08 | 0.08 | 0.08 | 0.08 | 0.08 | 0.08 |
| Ca Stearate | 0.07 | 0.07 | 0.07 | 0.07 | 0.07 | 0.07 | 0.07 | 0.07 | 0.07 | 0.07 | 0.07 | 0.07 | 0.07 |
| PPG 3232 Glass Fiber | 30 | 30 | 30 | 30 | 30 | 30 | 30 | 30 | 30 | 30 | 30 | 30 | 30 |
| TBMPM (meq/100 g compound) | 0.25 | 1.2 | 1.2 | 3.5 | 3.5 | 3.5 | 3.5 | 3.5 | 3.5 | 3.5 | 5.8 | 5.8 | 6.75 |
| TAC | 4.0 | 6.3 | 1.7 | 4.0 | 4.0 | 0.8 | 4.0 | 4.0 | 4.0 | 7.3 | 1.7 | 6.3 | 4.0 |
| Properties | | | | | | | | | | | | | |
| Unnotched Izod (J/m) | 402 | 742 | 751 | 575 | 601 | 658 | 527 | 518 | 563 | 542 | 514 | 560 | 536 |
| Notched Izod (J/m) | 68 | 99 | 109 | 96 | 95 | 106 | 102 | 104 | 103 | 91 | 85 | 93 | 84 |
| Flexural Modulus (MPa) | 5673 | 5906 | 6047 | 5922 | 5083 | 5779 | 6020 | 6139 | 6253 | 5633 | 6065 | 5411 | 5453 |
| Flexural Strength (MPa) | 122 | 140 | 148 | 141 | 130 | 139 | 141 | 145 | 148 | 136 | 132 | 133 | 127 |
| Tensile Strength (MPa) | 79 | 89 | 93 | 87 | 86 | 90 | 87 | 93 | 92 | 87 | 86 | 86 | 83 |
| Elongation @ Break (%) | 6.9 | 8.8 | 9.0 | 7.9 | 8.3 | 8.0 | 7.7 | 8.1 | 8.1 | 7.9 | 7.8 | 8.4 | 8.3 |
| MFR (g/10 min) | 21.4 | 50.0 | 55.4 | 88.2 | 85.4 | 91.2 | 82.0 | 82.4 | 85.8 | 85.4 | 64.2 | 73.0 | 70.0 |

*7.5 wt % TBMPM on 7026XOS
**10 wt % Perkalink TM 300 on 7026XOS

The best properties were achieved with 1.2 meq of the TBMPM modifying peroxide, probably due to an optimum melt flow rate for the particular processing. All variations improved several of the properties of the polymer end product.

EXAMPLES 29-37

In Examples 29-37 some comparisons are made between the one-step process and the two-step process. Examples 29-31 were performed using procedure E.1 above. Examples 32-37 were done using procedure E.2 above. All samples were done using polypropylene with an MFR of 23.9. The polypropylene carrier also had an MFR of 23.9.

Example 29 is a control example, without modification. Example 30 is a comparative example with the commercially available Hercoprime TM G201 coupling agent. The stabilizer ingredients are conventional, commercially available stabilizers for polypropylene.

The amounts of the ingredients employed are given in Table 12 along with the resulting properties.

TABLE 12

|  | Example Number | | | | | | | | |
|---|---|---|---|---|---|---|---|---|---|
|  | 29 | 30 | 31 | 32 | 33 | 34 | 35 | 36 | 37 |
| Component in wt % | | | | | | | | | |
| KP020 Polypropylene | 69.75 | 68.35 | 64.72 | 64.72 | 55.65 | 55.65 |  | 62.09 | 64.72 |
| Hercoprime TM G201 |  | 1.4 |  |  |  |  |  |  |  |
| TBMPM Concentrate* |  |  | 3.18 |  |  |  |  |  |  |
| TAC Concentrate** |  |  | 1.85 |  |  |  |  |  | 1.41 |

TABLE 12-continued

| | Example Number | | | | | | | | |
|---|---|---|---|---|---|---|---|---|---|
| | 29 | 30 | 31 | 32 | 33 | 34 | 35 | 36 | 37 |
| Pellet A | | | | 5.03 | | | | | |
| Pellet B | | | | | 14.1 | | | | |
| Pellet C | | | | | | 14.35 | | | |
| Pellet D | | | | | | | 70 | | |
| Pellet E | | | | | | | | 7.66 | |
| Pellet F | | | | | | | | | 3.62 |
| Irganox ™ 1010 | 0.1 | 0.1 | 0.1 | 0.1 | 0.1 | | | 0.1 | 0.1 |
| P-EPQ | 0.08 | 0.08 | 0.08 | 0.08 | 0.08 | | | 0.08 | 0.08 |
| Ca Stearate | 0.07 | 0.07 | 0.07 | 0.07 | 0.07 | | | 0.07 | 0.07 |
| PPG 3232 Glass Fiber | 30 | 30 | 30 | 30 | 30 | 30 | 30 | 30 | 30 |
| TBMPM (meq/100 g compound) | | | 1.2 | 1.2 | 1.2 | 1.2 | 1.2 | 1.2 | 1.2 |
| TAC (meq/100 g compound) | | | 2.1 | 2.1 | 2.1 | 2.1 | 2.1 | 5.1 | 2.1 |
| Properties | | | | | | | | | |
| Unnotched Izod (J/m) | 208 | 619 | 646 | 662 | 721 | 676 | 705 | 673 | 593 |
| Notched Izod (J/m) | 53 | 91 | 101 | 85 | 128 | 128 | 117 | 123 | 107 |
| Flexural Modulus (MPa) | 5622 | 5960 | 5829 | 5629 | 5739 | 5822 | 5850 | 5891 | 6029 |
| Flexural Strength (MPa) | 90 | 136 | 138 | 136 | 141 | 145 | 143 | 143 | 137 |
| Tensile Strength (MPa) | 59 | 84 | 87 | 88 | 88 | 91 | 89 | 91 | 88 |
| Elongation @ Break (%) | 4.6 | 8.3 | 8.9 | 8.9 | 9.3 | 9.4 | 9.0 | 9.5 | 8.7 |
| MFR | 12.9 | 14.4 | 56.1 | 14.3 | 16.5 | 17.4 | 54.0 | 14.2 | 13.7 |

*7.5 wt % TBMPM on 7026XOS
**10 wt % Perkalink ™ 300 on 7026XOS
Pellet A: Melt compounded mixture of 63.2 wt % TBMPM concentrate (7.5 wt % TBMPM on 7026XOS) and 36.8 wt % TAC concentrate (10 wt % Perkalink ™ 300 on 7026XOS), extruded on 30 mm Leistritz ™ twin screw extruder
Pellet B: Melt compounded mixture of 22.5 wt % TBMPM concentrate (7.5 wt % TBMPM on 7026XOS), 13.1 wt % TAC concentrate (10 wt % Perkalink ™ 300 on 7026XOS), and 64.4 wt % KP020, extruded on 30 mm Leistritz ™ twin screw extruder
Pellet C: Melt compounded mixture of 22.2 wt % TBMPM concentrate (7.5 wt % TBMPM on 7026XOS), 12.9 wt % TAC concentrate (10 wt % Perkalink ™ 300 on 7026XOS), 63.5 wt % KP020, and 1.4 wt % stabilizer (Irganox ™ 1010, P-EPQ, and Ca Stearate), extruded om 30 mm Leistritz ™ twin extruder
Pellet D: Melt compounded mixture of 4.5 wt % TBMPM concentrate (7.5 wt % TBMPM on 7026XOS), 12.9 wt % TAC concentrate (10 wt % Perkalink ™ 300 on 7026XOS), 92.63 wt % KP020, and 0.25 wt % stabilizer (Irganox ™ 1010, P-EPQ, and Ca Stearate), extruded on 30 mm Leistritz ™ twin screw extruder
Pellet E: Melt compounded mixture of 41.5 wt % TBMPM concentrate (7.5 wt % TBMPM on 7026XOS), and 58.5 wt % TAC concentrate (10 wt % Perkalink ™ 300 on 7026XOS), extruded on 30 mm Leistritz ™ twin screw extruder
Pellet F: Melt compounded mixture of 87.8 wt % TBMPM concentrate (7.5 wt % TBMPM on 7026XOS), and 12.2 wt % TAC concentrate (10 wt % Perkalink ™ 300 on 7026XOS), extruded on 30 mm Leistritz ™ twin screw extruder The results of examples 29–37 show that the two-step processing improved impact properties. The peroxide/-coagent modifiers were prepelletized in Examples 32–34. In Example 35, the resultant polymers had a high melt flow rate and a good property balance.

EXAMPLES 38–49

These examples are presented to further demonstrate the effects of the process of the present invention on the melt flow properties of modified polypropylene. Procedure E.1 above was employed for these examples. Capillary melt flow was tested at 230° C. using a 2.16 kg weight. Spiral melt flow was tested on a 1 oz. Battenfield injection moulder with a spiral mould. The barrel temperature was 232° C., the mould temperature was 66° C. and the injection pressure is given in Table 13. The average of three consecutive runs is reported in Table 13.

TABLE 13

| Example | 38 | 39 | 40 | 41 | 42 | 43 | 44 | 45 | 46 | 47 | 48 | 49 |
|---|---|---|---|---|---|---|---|---|---|---|---|---|
| Components of Examples | 11a | 11b | 11c | 10b | 10c | 14 | 17 | 18 | 19 | 20 | 21 | 25 |
| Melt Flow Properties | | | | | | | | | | | | |
| Capillary (g/10 min) | 9.0 | 12.4 | 76.9 | 51.4 | 70.8 | 24.4 | 50.0 | 55.4 | 88.2 | 85.4 | 81.2 | 85.4 |
| Spiral at 6.89 MPa (cm) | 72.9 | 88.4 | 146.3 | 131.3 | 143.3 | 100.8 | 130.6 | 130.0 | 154.2 | 149.1 | 159.5 | |
| Spiral at 4.13 MPa (cm) | — | — | 101 | — | 98 | — | — | — | — | 127 | 114 | 118 |

What is claimed is:

1. A process for the reinforcement of a (co)polymer selected from $C_3$–$C_{10}$ α-olefin polymers, ethylene polymers, diene polymers and copolymers of $C_3$–$C_{10}$ α-olefins with ethylene and/or a diene, wherein said process comprises contacting the (co)polymer with a peroxide represented by any of the formulas I-II to modify the (co)polymer:

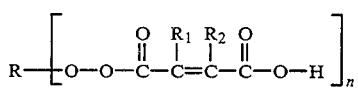 (I)

wherein n is 1-3, $R^1$ and $R^2$ are independently selected from hydrogen, $C_{1-10}$ alkyl groups, $C_{6-12}$ aryl groups, $C_{7-22}$ aralkyl groups and $C_{7-22}$ alkaryl groups, which groups may be substituted with one or more functional groups selected from hydroxy, halogen, ester, acid, amido, alkoxy, aryloxy, ketone and nitrile groups; and $R^1$ and $R^2$ may combine to form a ring;

when n=1; R=a tertiary alkyl group, a tertiary cycloalkyl group, a tertiary alkylcycloalkyl group, a tertiary alkynyl group containing 4–18 carbon atoms and a group of the general formula:

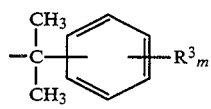

wherein m=0, 1 or 2 and $R^3$ represents an, isopropyl group, an isopropenyl group or a 2-hydroxyisopropyl group;

when n=2; R=an alkylene group with 7–12 carbon atoms which at both ends has a tertiary structure, an alkynylene group with 8–12 carbon atoms which at both ends has a tertiary structure, and a group of the general formula:

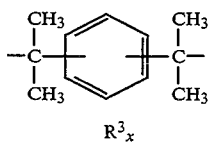

wherein x=0 or 1 and $R^3$ has the above-indicated meaning; and when n=3; R=1,2,4-triisopropylbenzene-$\alpha,\alpha',\alpha''$-triyl or 1,3,5-triisopropylbenzene-$\alpha,\alpha',\alpha''$-triyl; and

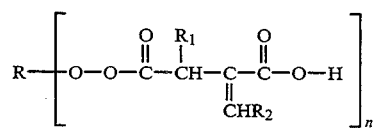 (II)

wherein n, R, $R^1$, $R^2$, are as defined above; and when there is an aromatic ring in the molecule in the case of disubstitution, the ring substituents must not be in a position ortho relative to each other and, in the case of trisubstitution, the ring substituents must not be in three adjacent positions; and in which process, before, during or after the contacting of the (co)polymer with the peroxide, at least one polymer reinforcing material is mixed with the (co)polymer.

2. The process according to claim 1 wherein the contacting of the (co)polymer with the peroxide is carried out in the additional presence of an effective amount of a coagent to influence the molecular weight and/or .enhance the degree of modification of the (co)polymer.

3. The process according to claim 1 wherein the polymer reinforcing material is selected from the group consisting of talc and fibrous glass material.

4. The process according to claim 3 wherein the contacting of the (co)polymer with the peroxide is carried out at a temperature of 120°–240° C.

5. The process according to claim 4 wherein the contacting of the (co)polymer with the peroxide is carried out in melted (co)polymer.

6. The process according to claim 5 wherein the step of mixing the (co)polymer with the polymer reinforcing material is done subsequently to the step of contacting the (co)polymer with the peroxide.

7. The process according to claim 6 wherein said process is carried out in the presence of an effective amount of at least one coagent to influence the molecular weight and/or enhance the degree of modification of the (co)polymer.

8. The process according to claim 7 wherein said (co)polymer is polypropylene, and said peroxide is selected from the group consisting of t-butylperoxy itaconic acid and -butylperoxy maleic acid.

9. The process according to claim 8 wherein said coagent is selected from the group consisting of triallyl cyanurate, triallyl isocyanurate, ethylene glycol dimethacrylate and trimethylolpropane trimethacrylate.

10. The process according to claim 6 wherein in said second step of mixing the (co)polymer with polymer reinforcing material, additional, unmodified (co)polymer is mixed with said polymer reinforcing material and said modified (co)polymer.

11. A process for the modification of a (co)polymer selected from $C_3$–$C_{10}$ $\alpha$-olefin polymers, ethylene polymers, diene polymers and copolymers of $C_3$–$C_{10}$ $\alpha$-olefins with ethylene and/or diene, wherein said process comprises that the (co)polymer is contacted with a peroxide represented by any of the formulas I-II whereby in the same processing step an effective amount of at least one polymer reinforcing material is added, to thereby modify the reinforced (co)polymer:

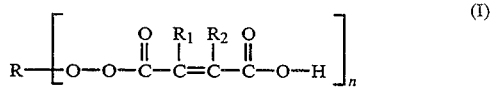 (I)

wherein n is 1-3, $R^1$ and $R^2$ are independently selected from hydrogen, $C_{1-10}$ alkyl groups, $C_{6-12}$ aryl groups, $C_{7-22}$ aralkyl groups and $C_{7-22}$ alkaryl groups, which groups may be substituted with one or more functional groups selected from hydroxy, halogen, ester, acid, amido, alkoxy, aryloxy, ketone and nitrile groups; and $R^1$ and $R_2$ may combine to form a ring;

when n=1; R=a tertiary alkyl group, a tertiary cycloalkyl group, a tertiary alkylcycloalkyl group, a tertiary alkynyl group containing 4–18 carbon atoms and a group of the general formula:

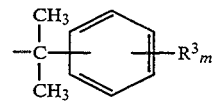

wherein m=0, 1 or 2 and $R^3$ represents an, isopropyl group, an isopropenyl group or a 2-hydroxyisopropyl group;

when n=2; R=an alkylene group with 7-12 carbon atoms which at both ends has a tertiary structure, an alkynylene group with 8-12 carbon atoms which at both ends has a tertiary structure, and a group of the general formula:

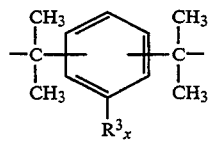

wherein x=0 or 1 and $R^3$ has the above-indicated meaning; and when n=3; R=1,2,4-triisopropylbenzene-$\alpha,\alpha',\alpha''$-triyl or 1,3,5-triisopropylbenzene-$\alpha,\alpha'',\alpha\Delta$-triyl; and

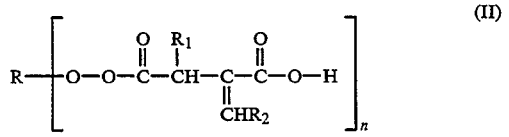

(II)

wherein n, R, $R^1$, $R^2$, are as defined above; and when there is an aromatic ring in the molecule in the case of disubstitution, the ring substituents must not be in a position ortho relative to each other and, in the case of trisubstitution, the ring substituents must not be in three adjacent positions.

12. A process according to claim 11 wherein the contacting of the (co)polymer with the peroxide is carried out in the presence of an effective amount of a coagent to influence the molecular weight and/or enhance the degree of modification of the (co)polymer.

13. A process according to claim 11 wherein the polymer reinforcing material is selected from the group consisting of talc and fibrous glass material.

14. A process according to claim 13 wherein the contacting of the (co)polymer with the peroxide is carried out at a temperature of 120°-240° C.

15. A process according to claim 14 wherein the contacting of the (co)polymer with the peroxide is carried out in melted (co)polymer.

16. A process according to claim 15 wherein the polymer reinforcing material is mixed with said (co)polymer in the same processing step as the contacting of the (co)polymer with the peroxide.

17. A process according to claim 16 wherein the polymer modification is carried out in the presence of an effective amount of at least one coagent to influence the molecular weight and/or enhance the degree of modification of the (co)polymer.

18. A process according to claim 17 wherein said (co)polymer is polypropylene and said peroxide is selected from the group consisting of t-butylperoxy itaconic acid and t-butylperoxy maleic acid.

19. A process according to with claim 18 wherein said coagent is selected from the group consisting of triallyl cyanurate, triallyl isocyanurate, ethylene glycol dimethacrylate and trimethylolpropane trimethacrylate.

20. A method of improving at least one property of a (co)polymer selected from $C_3$-$C_{10}$ $\alpha$-olefin polymers, ethylene polymers, diene polymers and copolymers of $C_3$-$C_{10}$ $\alpha$-olefine with ethylene, diene and mixtures thereof, which comprises contacting the (co)polymer with a peroxide represented by any of the formulas I-II of claim 11, which (co)polymer is reinforced with a polymer reinforcing material.

* * * * *

UNITED STATES PATENT AND TRADEMARK OFFICE
CERTIFICATE OF CORRECTION

PATENT NO. : 5,447,985
DATED : September 5, 1995
INVENTOR(S) : Anthony J. DeNicola Jr., et al.

It is certified that error appears in the above—identified patent and that said Letters Patent is hereby corrected as shown below:

Column 21, claim 11, line 19, please delete "-α, α″, α Δ-triyl" and replace with -- -α, α′, α″-triyl --.

Column 22, claim 19, line 1, please delete "with".

Signed and Sealed this

Twenty-eighth Day of November 1995

Attest:

BRUCE LEHMAN

*Attesting Officer*     *Commissioner of Patents and Trademarks*